United States Patent
Beart

(10) Patent No.: US 6,911,908 B1
(45) Date of Patent: Jun. 28, 2005

(54) SECURITY

(75) Inventor: Pilgrim Beart, Chippenham (GB)

(73) Assignee: Activerf Limited (GB)

( * ) Notice: Subject to any disclaimer, the term of this patent is extended or adjusted under 35 U.S.C. 154(b) by 452 days.

(21) Appl. No.: 10/110,276

(22) PCT Filed: Oct. 4, 2000

(86) PCT No.: PCT/GB00/03787

§ 371 (c)(1),
(2), (4) Date: Jul. 3, 2002

(87) PCT Pub. No.: WO01/27891

PCT Pub. Date: Apr. 19, 2001

(30) Foreign Application Priority Data

Oct. 8, 1999 (GB) ............................................. 9923682
Sep. 4, 2000 (GB) ............................................. 0021602

(51) Int. Cl.[7] .............................................. G08B 13/14
(52) U.S. Cl. ................... 340/571; 340/572.1; 340/5.91; 340/5.92; 340/523; 235/375; 194/905; 705/28; 280/33.994; 186/62
(58) Field of Search ................... 340/571, 572.1–572.9, 340/568.1, 523, 568.5, 539.1, 5.91, 5.92, 825.49; 235/375, 376, 380, 382, 384, 385, 450, 451, 435, 439; 194/905; 705/10, 16, 17, 18, 21, 22, 23, 28, 30; 280/33.996; 186/62

(56) References Cited

U.S. PATENT DOCUMENTS

| | | | | | |
|---|---|---|---|---|---|
| 4,524,350 A | * | 6/1985 | Eccleston | ................. | 340/572.2 |
| 4,576,274 A | * | 3/1986 | Thorsen | ....................... | 194/210 |
| 4,577,880 A | * | 3/1986 | Bianco | ................... | 280/33.994 |
| 4,658,263 A | * | 4/1987 | Urbanski | ..................... | 343/788 |
| 4,700,179 A | * | 10/1987 | Fancher | ................... | 340/572.2 |
| 4,769,631 A | * | 9/1988 | Copeland | ..................... | 340/551 |
| 4,800,369 A | * | 1/1989 | Gomi et al. | ............. | 340/568.2 |
| 4,888,579 A | * | 12/1989 | ReMine et al. | ........... | 340/572.4 |
| 5,005,125 A | * | 4/1991 | Farrar et al. | ................... | 705/28 |
| 5,151,684 A | * | 9/1992 | Johnsen | ..................... | 340/568.1 |
| 5,194,844 A | * | 3/1993 | Zelda | ..................... | 340/426.11 |
| 5,260,690 A | * | 11/1993 | Mann et al. | ............... | 340/572.2 |
| 5,260,694 A | * | 11/1993 | Remahl | ....................... | 340/674 |
| 5,264,822 A | * | 11/1993 | Vogelman et al. | ...... | 340/286.01 |
| 5,283,550 A | * | 2/1994 | MacIntyre | ............. | 340/539.21 |
| 5,537,094 A | * | 7/1996 | Bettine et al. | ........... | 340/572.4 |

(Continued)

FOREIGN PATENT DOCUMENTS

| | | |
|---|---|---|
| DE | 4431204 | 3/1996 |
| DE | 19529456 | 10/1996 |
| EP | 0 435 198 A2 | 7/1991 |
| GB | 1406925 | 9/1975 |
| WO | WO 98/00819 | 1/1998 |
| WO | WO 99/59112 | 11/1999 |
| WO | WO 01/15103 | 3/2001 |

OTHER PUBLICATIONS

US 4,973,852, 11/1990, Denkevitz (withdrawn)

*Primary Examiner*—Benjamin Lee
(74) *Attorney, Agent, or Firm*—Sheridan Ross P.C.

(57) ABSTRACT

A security system for protecting articles (8), the system comprising at least one Electronic Article Surveillance (EAS) loop (1), one Emitting Unit (7) and one Detecting Unit (9) attached to each article (8) to be protected, the Detecting Unit (9) having a detector to detect electromagnetic fields emitted by the EAS loop (4) and the Emitting Unit (7) and to distinguish between them, and an alarm generator for generating an alarm if a predetermined sequence of fields is detected. The system combines existing EAS loops (4) normally present in a retail store with Emitting Units (7) and Detecting Units (9) so as to monitor movement of articles (8), especially supermarket trolleys, around the retail store.

39 Claims, 3 Drawing Sheets

U.S. PATENT DOCUMENTS

| | | | |
|---|---|---|---|
| 5,570,080 A | * 10/1996 | Inoue et al. | 340/571 |
| 5,646,616 A | * 7/1997 | Komatsu | 340/988 |
| 5,661,457 A | * 8/1997 | Ghaffari et al. | 340/572.7 |
| 5,710,540 A | * 1/1998 | Clement et al. | 340/572.4 |
| 6,025,780 A | * 2/2000 | Bowers et al. | 340/572.3 |
| 6,169,483 B1 | * 1/2001 | Ghaffari et al. | 340/572.3 |
| 6,206,165 B1 | * 3/2001 | Lenander | 194/213 |
| 6,307,473 B1 | 10/2001 | Zampini et al. | 340/572.1 |
| 6,433,689 B1 | * 8/2002 | Hovind et al. | 340/573.1 |

* cited by examiner

SECURITY

This invention relates to a new security system and a method of providing security.

It is well known that it is desirable to provide security for various types of articles. For example, items of value such as clothing or other goods may be stolen from a retail store environment by simply placing them in a shopping trolley and pushing the trolley from the store without payment, a form of crime known as a "push-out" or "push-through".

The primary form of deterrent in common use in such environments is the Electronic Article Surveillance (EAS) system, for example those manufactured by the Sensormatic Electronics Corporation (for example see U.S. Pat. No. 3,895,368: "Surveillance system and method utilising both electrostatic and electromagnetic fields"). In these systems, some form of passive (unpowered) tag is attached to the item to be guarded and normally removed or deactivated at the checkout till. If the item is not taken to a checkout then the tag is not removed, and its presence is detected by loops at the store exit, causing an alarm. The loops generate an alternating electromagnetic and/or electrostatic field with particular characteristics, the presence of a tag then causing perturbations in this field which are detected by the loop, causing an alarm to sound to warn security staff that a theft is occurring.

Various tag-construction and tag-detection methods are employed by these systems, operating at various frequencies from several 100 Hz to 100 kHz and above. An example is acousto-magnetic detection whereby a magnetic material in the tag is caused to resonate by a short burst of excitation from the loops, and this resonance then induces back a small "ringing" current in the loops which causes the alarm to sound. Alternatively the tag may contain a diode which causes re-radiation of received energy at harmonic frequencies, this again being detected by the loops. Other methods are used also. The precise mechanism of these systems is not relevant to the present invention, the important feature being that that all such systems use one or more loops located at the store exits which transmit a detectable AC electromagnetic field with defined characteristics.

It is known from DE 195 29 456 to provide transponders or barcodes on individual supermarket trolleys and to monitor movement of the trolleys about a store by interrogating the trolleys electromagnetically or by way of a barcode reader at predetermined locations. This allows an alarm to be generated if a trolley is detected to have been pushed into a store and then out again without passing through a checkout. This system makes no use of existing EAS infrastructures.

According to a first aspect of this invention there is provided a security system for protecting articles, the system comprising at least one Emitting Unit, and one Detecting Unit attached to each article to be protected, characterised in that there is further provided at least one Electronic Article Surveillance (EAS) loop of a type used for detecting the passage of traditional EAS tags, wherein the Detecting Unit has a detector for detecting electromagnetic fields emitted by the EAS loop and the Emitting Unit and distinguishing between them, and an alarm generator for generating an alarm if a predetermined sequence of fields is detected.

Such a system is advantageous because it reuses the EAS loop infrastructure already installed in many locations to provide a different type of security.

The EAS loop may be of a common type well-known to those skilled in the art, being for the purposes of this invention any system which emits an electromagnetic field with defined characteristics, for example but not limited to its frequency and pulse-rate, this system being located at a point or points beyond which a customer is not expected to pass without having first paid for their purchases. There may be many EAS loops at each such point, and many such points.

The Emitting Unit comprises a processor and an electromagnetic field generator, the processor being adapted to control the electromagnetic field generator such that the emitted field is distinct in some characteristic way from that emitted by the EAS loop, for example but not limited to having a distinct frequency and/or pulse-rate. The electromagnetic field generator may be a wire loop, possibly wound around an inductive former, possibly composed of a material of high relative permittivity. Alternatively the generator may be a whip or helical wire antenna or dielectric resonator antenna.

The Detecting Unit comprises a power source adapted to power the unit, an electromagnetic field detector, a processor, an alarm generator, and a mechanism for attaching the Detecting Unit, preferably permanently, to the article to be protected, the processor being adapted to monitor the characteristics of any proximal field sensed by the electromagnetic field detector and to cause the alarm generator to generate an alarm when a predetermined sequence of events is satisfied. The electromagnetic field detector may be a wire loop, possibly wound around an inductive former, possibly composed of a material of high relative permittivity. Alternatively the detector may be a whip or helical wire antenna or dielectric resonator antenna.

The processor in each of the Emitting and Detecting Units separately may be hard-wired logic (possibly within an ASIC), a microprocessor or micro-controller, in each case containing some amount of memory storage. In one embodiment the micro-controller may be from the PIC series from the Micro-Chip Corporation.

The power source of the Detecting Unit may be a battery which provides a convenient source of power. The battery may or may not be rechargeable. Alternatively, or additionally, a solar cell may provide the source of power. A capacitor may be provided in association with the solar cell, allowing power fluctuations in the output of the cell to be smoothed. Alternatively, or additionally, power may be derived from an external power supply, which may or may not be permanently wired to the unit. In another alternative or additional embodiment, power may be derived via electromagnetic coupling from the EAS loop and Emitting unit. Power may also be provided from motion via an electric generator or piezo generator.

The alarm generator of the Detecting Unit may be provided by one or more of the following: a piezo electric sounder (or other sound or vibration-generating mechanism), a light emitting display, display screen, radio frequency or other electromagnetic transmitter, electric shock generator, an electromechanical trolley wheel brake, or by signalling to a connected apparatus, or causing the EAS system to alarm by changing the electromagnetic properties of a connected circuit or device, for example the resonance of a loop.

The article to be protected, to which the Detecting Unit is attached, may be for example but not limited to, an item of value, or a container for such items, for example a supermarket trolley. An advantage of protecting a supermarket trolley in this way is that several common EAS systems cannot detect tagged articles when they are contained within a trolley, because the trolley's metalwork interferes with the electromagnetic field of the EAS system.

The method of attachment of the Detecting Unit may be of any sort, including gluing, ultrasonic welding, screwing, bolting (including by non-standard screw types such as Torx), riveting and attachment via tie-wraps.

To deter removal of the Detecting Unit it may be permanently manufactured into the article to be protected, for example as part of the handle or wheel of a supermarket trolley.

The predetermined sequence of events causing the processor in the Detecting Unit to cause an alarm may be the detection of proximity to the EAS loop more than twice in sequence without an intervening detection of the Emitting Unit. The alarm may or may not also be raised on any subsequent detections.

The Detecting Unit may be provided with a mechanism for entering an extremely low-power state while in use except when a field (from the EAS loop or Emitting Unit) is entered or left, thus conserving battery power.

The Detecting Unit may in addition be equipped with a mechanism to detect tampering or removal from the item to which it is attached, causing an immediate alarm, this mechanism could be for example but not limited to an electromechanical switch or optical sensor.

In addition, if two or more EAS loops or Emitting Units are present around one location (for example on either side of a doorway), operating in some co-ordinated fashion (for example by pulsing alternately), the processor of the Detecting Unit may only recognize the combined effect of the fields, thus ensuring that, for example, the Detecting Unit is triggered only by moving through a doorway, and not merely by moving past in the vicinity thereof.

The Detecting Unit may in addition be equipped with a mechanism to measure the field strength of the detected field, this mechanism could be for example but not limited to an Analogue-to-Digital converter connected to the processor, or simply a circuit enabling the processor to discharge the electromagnetic detector and measure the time taken to discharge it a certain amount (and thus indirectly measure how charged it was originally).

The Detecting Unit may in addition measure the time taken from the point at which the field is first detected to a point at which the field becomes strong enough to be recognised, or reaches some other predefined strength, or falls below some threshold again. This allows the Detecting Unit to estimate the speed with which it is moving through the field.

The Emitting Unit may in addition be adapted to emit electromagnetic radiation with one of several sets of characteristics (for example, at one of several different pulse-rates), the chosen characteristic setting being switchable by way of a switch or external signal. The Detecting Unit may apply a different alarm event-sequence rule according to the on the characteristics of the field from the Emitting Unit. For example when a supermarket checkout is unoccupied an Emitting Unit located within it may be set to an alternative setting meaning "closed", and any Detecting Unit being pushed past such an Emitting Unit will immediately sound the alarm.

The Detecting Unit may be substantially waterproof.

The Detecting Unit may keep an internal log of its usage patterns.

The Detecting Unit may have a unique identification code or number as part of the memory state of the processor.

In retail environments where customers are issued with 'loyalty cards' by the retailer in question (these loyalty cards allowing the retailer to monitor customers's spending habits and optionally to provide discounts and the like), the Detecting Unit may be in communication (locally or remotely) with a unit capable of scanning a customer's loyalty card before the customer begins to shop (for example in supermarkets where "self-scanning" is in operation, the loyalty card is used to release the self-scanning unit from a storage bay). In this case the Detecting Unit can incorporate in its internal memory state a unique customer identification number from the loyalty card.

The Detecting Unit may report part or all of its internal memory state, including its unique identification code or number where provided, via modulation of its alarm generator, possibly in response to an external energising field with particular predetermined characteristics. Alternatively, the Detecting Unit may be provided with a mechanism for reporting part or all of its internal memory state, including its unique identification code or number where provided, in response to an interrogation signal from, for example, an Emitting Unit or a dedicated Interrogation Unit adapted to issue an interrogation signal and to receive a response signal from the Detecting Unit. The Interrogation Unit may be a portable or hand-held unit operable by authorised personnel, or may be permanently fixed in an appropriate location. The interrogating Emitting or Interrogation Units are preferably linked to a central computer for collation and processing of data.

The Detecting Unit may additionally have a mechanism to sense the charge-state of its battery. A low battery condition may be reported as part of the internal memory state.

The EAS loop or loops may be replaced by an Emitting Unit or Units.

EAS loops or Emitting Units with different characteristics may be placed at different points in an installation, for example but not limited to one type at entries and one type at exits, or one type on the inside of a store entrance and one type on the outside, allowing the Detecting Unit to differentiate between these points and thus discriminate more accurately between different types of criminal behaviour, for example pushing a trolley out of the door marked "in", or leaving immediately after visiting a high-value goods area.

The Detecting Unit may contain multiple electromagnetic field detectors, each designed to detect a different type of field.

The Emitting Unit may use a protocol to encrypt its emitted field as a complex and changing sequence of pulses according to a predetermined algorithm, making it difficult or impossible for a would-be thief to construct a box which causes the Detecting Unit to be fooled into thinking it has sensed a valid Emitting Unit. An example of such a protocol is Keeloq protocol from Microchip Technology Inc.

The Detecting Unit may contain a mechanism to count the number of identical signals received from the Emitting Unit, and only treat the emitted field as "detected" if this count exceeds a certain number, this providing increased operational robustness.

According to a second aspect of this invention there is provided a method of providing security for articles, wherein there is provided at least one Emitting Unit, and at least one Detecting Unit attached to each article to be protected, characterised in that there is further provided at least one Electronic Article Surveillance (EAS) loop of a type used for detecting the passage of traditional EAS tags, wherein the Detecting Unit detects electromagnetic fields emitted by the EAS loop and the Emitting Unit and distinguishes between them, an alarm being generated if a predetermined sequence of fields is detected.

Such a method is advantageous because it reuses the EAS loop infrastructure already installed in many locations to provide a different, additional, type of security.

In one embodiment, the method may generate an alarm when the Detecting Unit detects a disallowed sequence of visits to one or more EAS loops and/or Emitting Units.

Alternatively, or additionally, the alarm may be in the form of a radio or other electromagnetic transmission to a remote receiver, allowing the alarm to be given by, for example, a strobe light above a doorway, or a paging device given to a security guard. Alternatively or in addition, a security camera may be activated. This feature also allows embodiments of the present invention to be tested silently upon initial installation and during routine maintenance.

Preferably the Detecting Unit is permanently attached to an item to be guarded, and alternatively or additionally is able to detect attempts to remove it from the item, such removal being an immediate alarm condition.

Preferably the method also provides for the Detecting Unit to monitor the state of its power-source.

Alternatively, or additionally, the method provides for the Emitting Unit to emit a field with selectable characteristics. These characteristics may be sensed by the Detecting Unit and used to alter the behaviour of the system, for example if a checkout lane is closed the Emitting Unit may emit a field with different characteristics which causes the Detecting Unit to immediately alarm when nearby.

Preferably the method also provides for the Detecting Unit to detect the local strength of emitted fields.

Preferably, the method provides for the Detecting Unit to keep an internal log of its usage patterns.

Preferably, the method includes the assignment of a unique code or number to each Detecting Unit.

Preferably, the method provides for the Detecting Unit to report part or all of its internal memory state via modulation of its alarm generator, or other output mechanism, possibly in response to an external energising field with particular characteristics, which may be generated by an Emitting Unit or by a dedicated Interrogation Unit which may in turn be linked to a central computer so as to allow information to be collated and processed.

Additionally, the Detecting Unit may be adapted to detect several different types of field, for example to allow use with different brands of EAS loop which operate at different frequencies.

In addition to providing security, the system and method of the present invention may also be used to provide retail management information and to provide information to customers. For example, since each Detecting Unit may be provided with a unique identification code or number and a mechanism for storing an internal log of usage patterns, it is possible to monitor the movements of, for example, a trolley to which the Detecting Unit is attached by interrogating the Detecting Unit. In this way, it is possible to measure one or more of the following:

- the number of attempted "push-outs"
- the number of trolleys in use at any one time (which gives an indication of the number of customers in the supermarket store at any one time)
- the duration of each customer visit
- the length of the checkout queue, and the number of checkouts in use at any one time
- the relative usage patterns of different types of trolley in a trolley fleet (e.g. large, small, adapted for use with wheelchairs etc.)
- how often each trolley is used (which can be useful when planning routine trolley maintenance)
- the battery condition of each Detecting Unit All of this information may be transmitted in real time or periodically to a central computer for collation and processing, and may additionally be accessed remotely, for example by way of the Internet, so as to allow central analysis of information relating to a group of supermarket stores or the like. Statistics may be generated providing summary information against time of day, week, season etc.

In addition, if additional Emitting Units emitting distinguishable coded fields are placed in the operating environment, the Detecting Unit can measure when and how often it passes each Emitting Unit. This can be used, for example, to measure how often supermarket customers visit a particular place in the supermarket (i.e. "impressions").

Furthermore, the system may be used for pro-active advertising. If the additional Emitting Units are capable of receiving transmitted information from the Detecting Units (as described hereinabove) then the Emitting Units may also be adapted to attract a customer's attention, for example by way of a display device or sound generator, allowing pro-active advertising. Alternatively, an Emitting Unit may simply emit a code indicating to the Detecting Unit that it should activate some connected advertising mechanism, for example a light-emitting diode within an advertisement on the handle of the trolley. For example, a "Coca-Cola®" advertisement on the handle could illuminate when the trolley is in the vicinity of the "Coca-Cola®" shelves.

The Emitting Units may be centrally controlled to emit such a code on demand, causing all trolleys to react. For example, the "Coca-Cola®" advertisement could be triggered only during an announcement over a store's loudspeaker system.

If the Detecting Unit is adapted to memorise customer identification numbers (as described hereinabove in relation to loyalty cards) then such advertising can be directed towards particular customers or groups of customers.

For a better understanding of the present invention and to show how it may be carried into effect, reference shall now be made by way of example to the accompanying drawings, in which.

Figure 1:
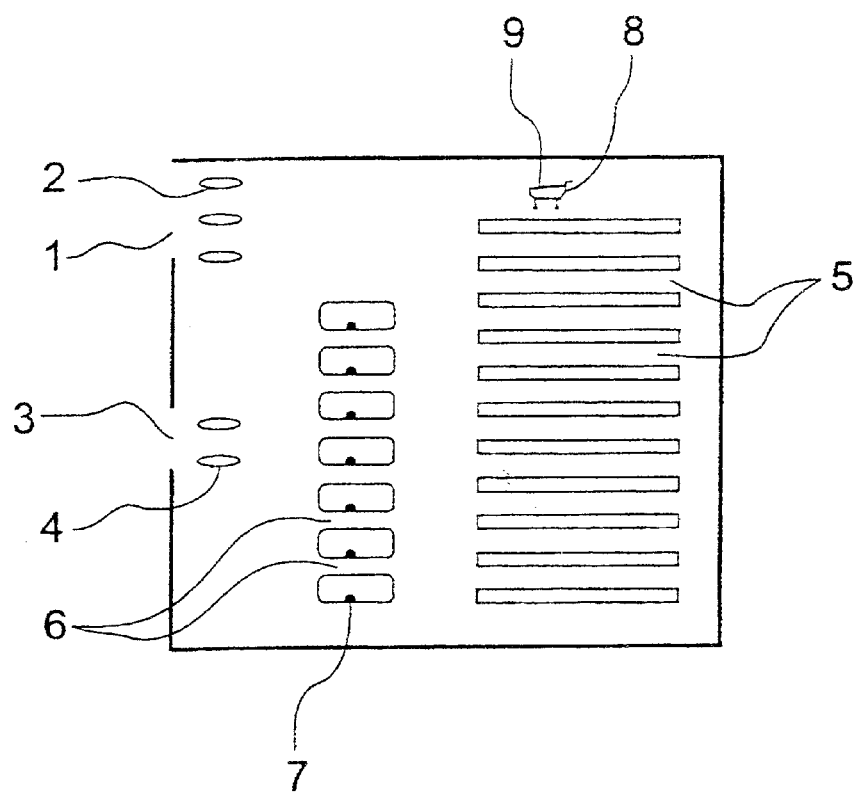
FIG. 1 shows a plan view of a supermarket store in schematic form.

FIG. 1 shows a plan view of a supermarket store in schematic form, the store having an entrance 1 guarded by EAS loops or gates 2, an exit 3 guarded by EAS loops or gates 4, a number of aisles 5 in which goods (not shown) are displayed for sale, and a number of checkout lanes 6 through which honest customers will pass and where payment is made for selected goods, each checkout lane 6 being provided with an Emitting Unit 7. There is also shown a trolley 8 provided with a Detecting Unit 9.

Figure 2:
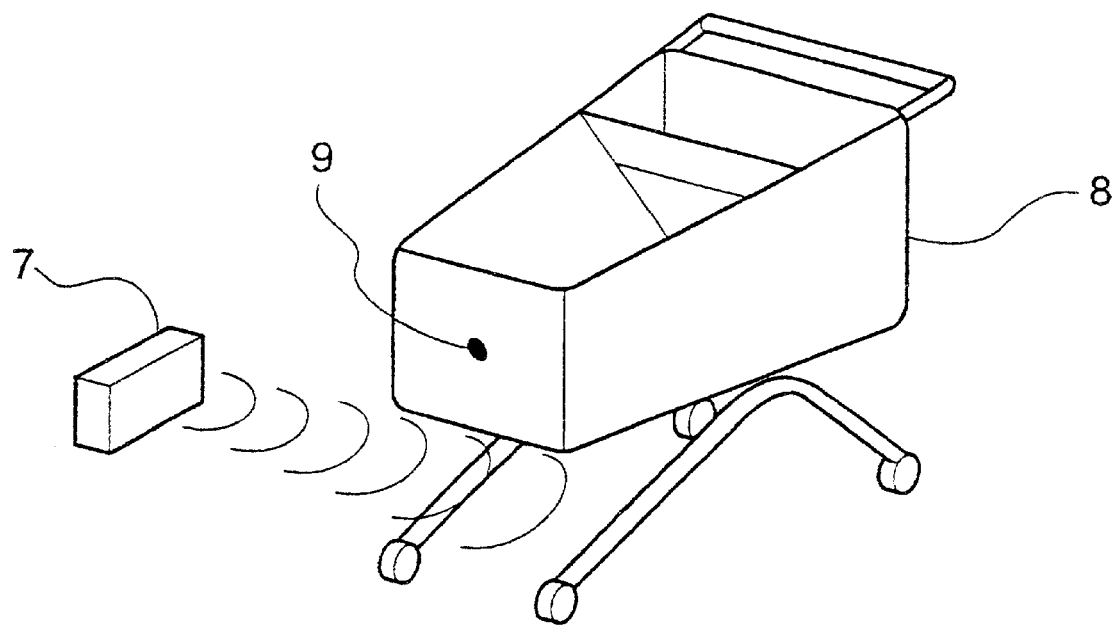
FIG. 2 shows a trolley on which is mounted a Detecting Unit.

The trolley 8 is shown in more detail in FIG. 2, with the Detecting Unit 9 being mounted on a front portion of the trolley 8, and the trolley 8 being in proximity to an Emitting Unit 7.

Figure 3:
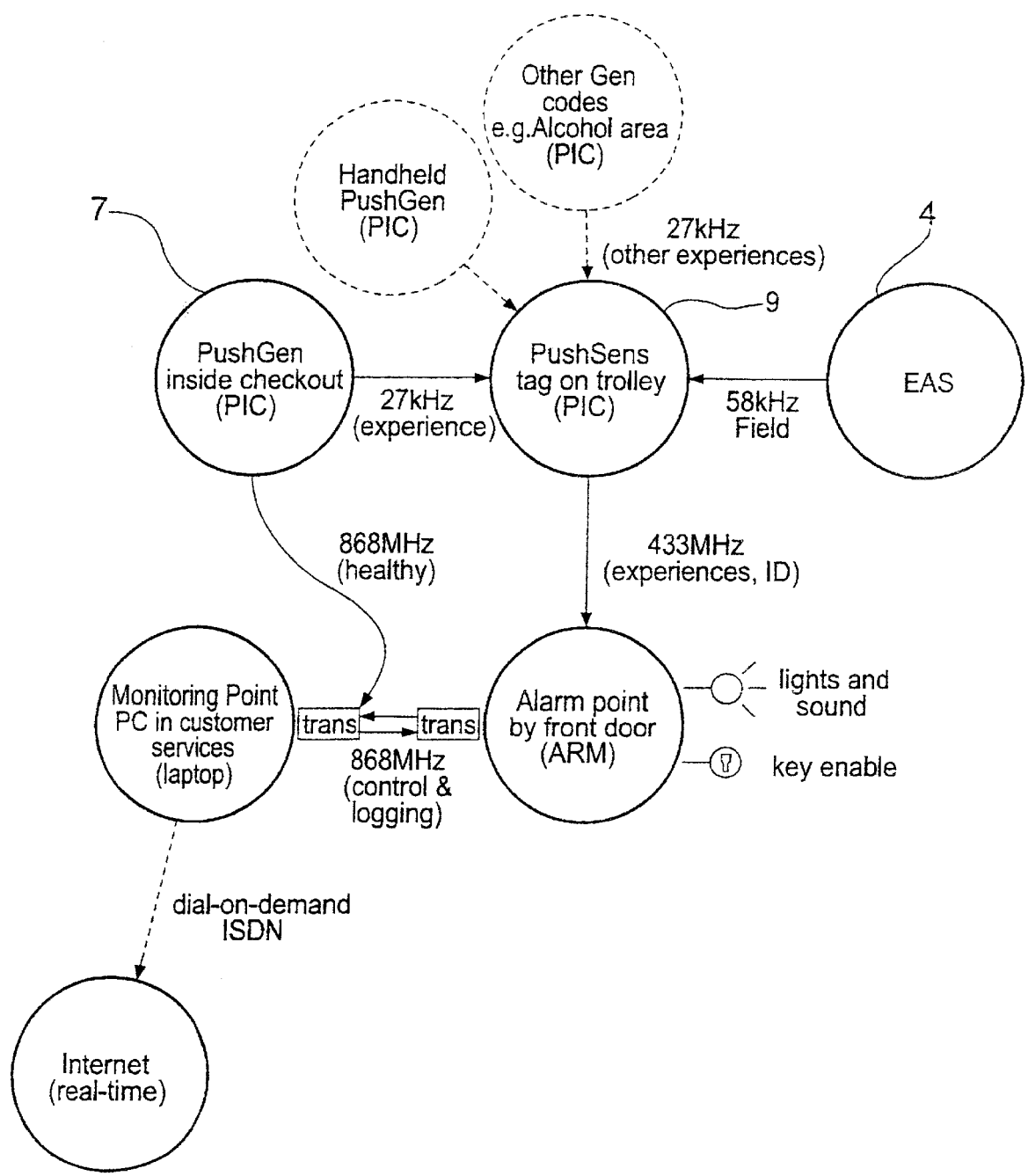
FIG. 3 shows an installation of an embodiment of the present invention in schematic form.

Referring now to FIG. 3 in addition to FIG. 1, there is shown schematically a trolley-mounted Detecting Unit 9, an EAS loop or gate 4 and an Emitting Unit 7. In this embodiment, EAS loops or gates 4 are present at all the exits 3 of the supermarket store, and an Emitting Unit 7 is located within or close to every point of payment, for example within each checkout lane 6 of the supermarket. A Detecting Unit 9 is attached to each supermarket trolley 8.

Figure 4:
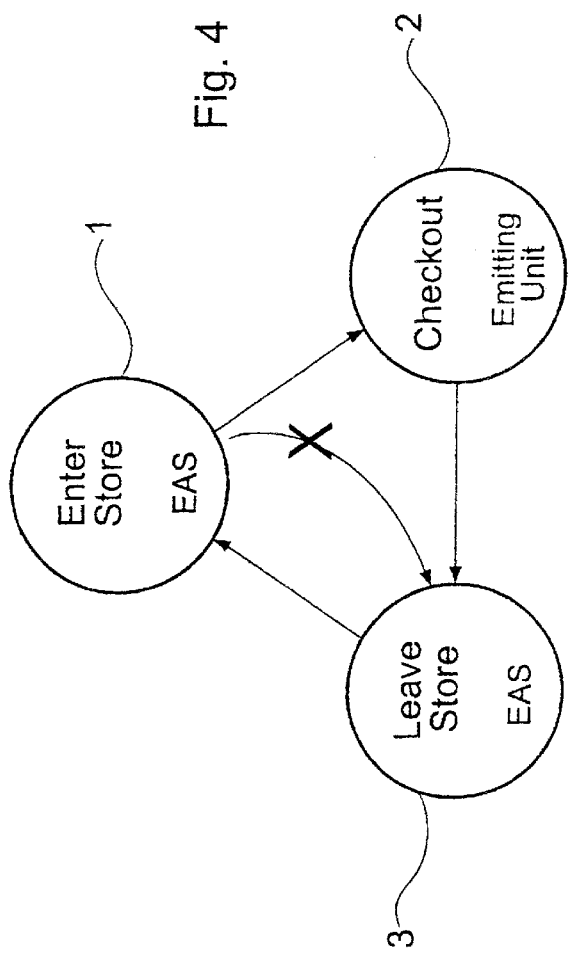
FIG. 4 shows an example of desired and undesired sequences of field-detection.

Referring now to FIG. 4 in addition to FIG. 1, the sequence of events for each honest customer will be:

1. Collect trolley 8 from outside store and enter store (past EAS loop or gate 2).
2. Fill trolley 8 with goods and visit checkout lane 6 (past Emitting Unit 7).
3. Leave store (past EAS loop or gate 4).

From the point of view of the Detecting Unit 9, and starting at the checkout lane 6, the sequence of events will be normally be:

2. Detect field from Emitting Unit 7 as a first customer pays at checkout lane 6.
3. Detect field from EAS loop or gate 4 as the first customer pushes the trolley 8 out of the store.
1. Detect field from EAS loop or gate 2 as a second customer pushes the trolley 8 back into the store.
4. Return to step 2.

In this example, if the second customer is a criminal attempting a push-out they will not pass the checkout lane 6 before exiting. So instead of the above sequence the Detecting Unit 9 sees:

2. Detect field from Emitting Unit 7 as the first customer pays at the checkout lane 6.
3. Detect field from EAS loop or gate 4 as the first customer pushes the trolley 8 out of the store.
1. Detect field from EAS loop or gate 2 as the second customer pushes the trolley 8 back into the store.
3. Detect field from EAS loop or gate 2 or 4 as the second customer attempts a push-out through entrance 1 or exit 3.

The Detecting Unit 9 has now detected the EAS field three times in a row since the last detection of the Emitting Unit 7 and immediately causes an alarm.

Another way to interpret this behaviour is that the Emitting Unit 7 in the checkout lane 6 "charges up" the Detecting Unit 9 with two "credits" to pass the EAS loops or gates 2 or 4 (these "credits" being purely logical devices for the purposes of this explanation, but equivalent to some counting logic in the Detecting Unit 9 processor). One credit is used up when the trolley 8 exits and the other credit is used up when the trolley 8 re-enters with the next customer. Any attempt to leave without "recharging" the Detecting Unit 9 at the checkout lane 6 will cause a "debt" on the next exit and thus trigger an alarm.

Figure 5:
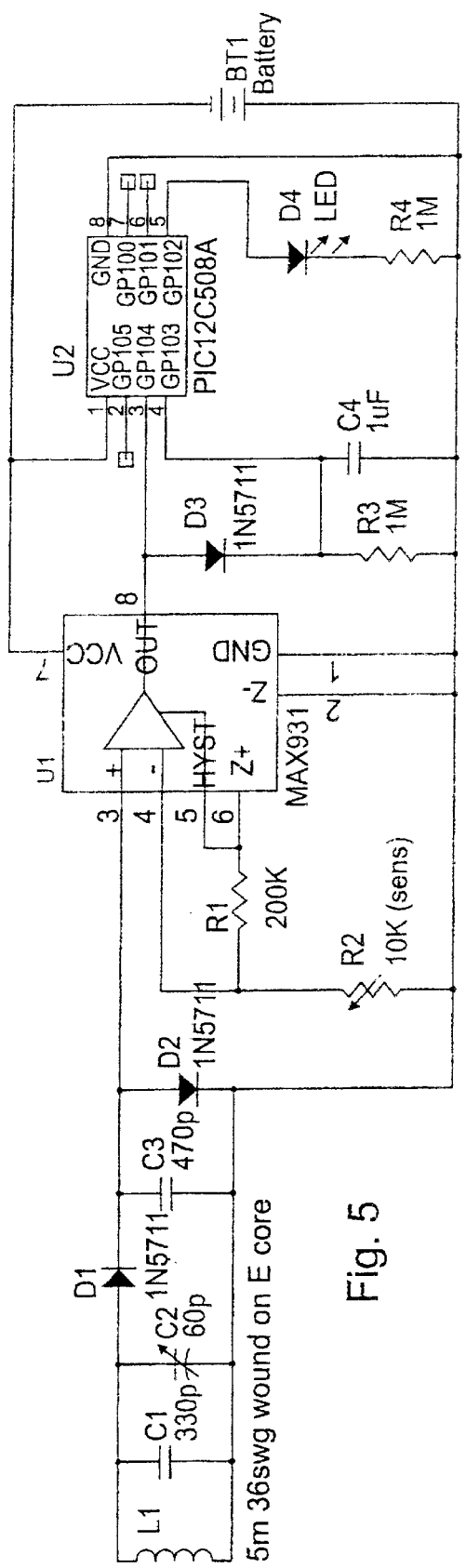
FIG. 5 shows a circuit diagram for realising a Detecting Unit.

An example of a circuit for providing a Detecting Unit 9 is shown in FIG. 5. The electromagnetic detector comprises the following components:

Inductor L1, capacitors C1, C2, diode D1 and capacitor C3 form a resonant circuit, capacitor C2 being adjustable to tune the resonance of the circuit to the frequency of operation.

In the presence of the Emitting Unit 7 or an EAS loop or gate 2 or 4, a voltage develops across capacitor C3 proportional to the strength of the emitted field. Diode D2 prevents this voltage from exceeding a predetermined small value, thus avoiding saturation due to a very strong field.

U1 is an ultra-low-power comparator with an onboard Zener diode reference. When the voltage across capacitor C3 rises to more than a specific threshold value its output pin 8 goes to VCC on the comparator U1. This threshold value can be adjusted by way of variable resistor R2.

The processor is in this case a PIC12C508A microcontroller, U2, normally in an ultra low-power sleep state. The output of comparator U1 pin 8 is filtered by diode D3, resistor R3 and capacitor C4 to provide a signal to pin 4 of microcontroller U2 which goes high and stays high whenever the electromagnetic detector is detecting a field, even if that field is pulsed. When microcontroller U2 pin 4 changes state, the microcontroller U2 is woken up from its sleep state and measures the characteristics of the detected field, in this case the pulse repetition frequency. After a programmable number of such detections (for reliability), microcontroller U2 recognises the type of field as coming from an EAS loop or gate 2 or 4, or an Emitting Unit 7 in some state (e.g. "checkout open" or "checkout closed"), and adjusts its internal memory state accordingly. Should an alarm condition be created, diode D4 provides the alarm generator in this case. A power source is provided by a 6V lithium battery BT1.

What is claimed is:

1. A security system for protecting articles, the system comprising at least one Emitting Unit, and one Detecting Unit attached to each article to be protected, characterized in that there is further provided at least one Electronic Article Surveillance (EAS) loop of a type used for detecting the passage of traditional EAS tags, wherein the Detecting Unit has a detector for detecting electromagnetic fields emitted by the EAS loop and the Emitting Unit and distinguishing between them, and an alarm generator for generating an alarm if a predetermined sequence of fields is detected.

2. A system as claimed in claim 1, wherein the Emitting Unit comprises a processor and an electromagnetic field generator, the processor being adapted to control the electromagnetic field generator such that the emitted field is distinct in some characteristic way from that emitted by the EAS loop.

3. A system as claimed in claim 1, wherein the Detecting Unit comprises a power source adapted to power the unit, an electromagnetic field detector, a processor, an alarm generator, and a mechanism for attaching the Detecting Unit to the article to be protected, the processor being adapted to monitor characteristics of any proximal field sensed by the electromagnetic field detector and to cause the alarm generator to generate an alarm when a predetermined sequence of events is satisfied.

4. A system as claimed in claim 3, wherein the Detecting Unit has a unique identification code or number as part of a memory state of the processor.

5. A system as claimed in claim 3, wherein the Detecting Unit is in communication with a unit adapted to scan a loyalty card issued to a person, the loyalty card including a unique personal identification number serving to identify the person, and wherein the Detecting Unit is adapted to incorporate the unique personal identification number in a memory state of the processor.

6. A system as claimed in claim 1, wherein the article to be protected is a supermarket trolley.

7. A system as claimed in claim 6, wherein the Detecting Unit is formed as an integral part of the supermarket trolley.

8. A system as claimed in claim 7, wherein the Detecting Unit is formed as part of a handle of the supermarket trolley.

9. A system as claimed in claim 7, wherein the Detecting Unit is formed as part 5 of a wheel of the supermarket trolley.

10. A system as claimed in claim 1, wherein the predetermined sequence of fields comprises detection of proximity to the EAS loop more than twice in sequence without an intervening detection of the Emitting Unit.

11. A system as claimed in claim 1, wherein the Detecting Unit is adapted to measure a field strength of a detected field.

12. A system as claimed in claim 1, wherein the Detecting Unit is adapted to 15 measure a time taken from a point when a field is first detected to a point where the field reaches a predetermined field strength.

13. A system as claimed in claim l, wherein the Emitting Unit is adapted selectively to emit an electromagnetic radiation pattern chosen from a set of characteristic electromagnetic radiation patterns, the selection being made in response to a switch setting or an external signal.

14. A system as claimed in claim 13, wherein the Detecting Unit applies a different alarm response for different detected characteristic electromagnetic radiation patterns.

15. A system as claimed in claim 1, wherein the Detecting Unit keeps an internal log of its usage patterns.

16. A system as claimed in claim 1, wherein the Detecting Unit is adapted to report all or part of an internal memory state by way of modulation of its alarm generator.

17. A system as claimed in claim 1, wherein the Detecting Unit is adapted to report all or part of an internal memory state in response to an interrogation signal from an interrogation unit adapted to issue an interrogation signal and to receive a response signal from the Detecting Unit.

18. A system as claimed in claim 17, wherein the interrogation unit is an Emitting Unit.

19. A system as claimed in claim 1, wherein a plurality of Emitting Units is provided at predetermined locations, each Emitting Unit emitting a distinguishable electromagnetic field, and wherein the Detecting Unit is adapted to detect when and how often it passes each Emitting Unit and to transmit this information, together with a unique identification code or number serving to identify the Detecting Unit, to a central computer.

20. A system as claimed in claim 1, wherein a plurality of Emitting Units is provided at predetermined locations, each Emitting Unit emitting a distinguishable electromagnetic field, wherein the Detecting Unit is provided with a visual display or sound generator, and wherein the Emitting Units are adapted to transmit information to the Detecting Unit so as to activate the visual display or sound generator to issue a visible or audible signal.

21. A system as claimed in claim 1, wherein a plurality of Emitting Units each provided with a visual display or a sound generator is provided at predetermined locations, wherein the Detecting Unit is provided with a transmitter for transmitting information to the Emitting Units so as to indicate its presence, and wherein the visual display or sound generator is activated to issue a visible or audio signal in response to the presence of the Detecting Unit.

22. A method of providing security for articles, wherein there is provided at least one Emitting Unit, and at least one Detecting Unit attached to each article to be protected, characterized in that there is further provided at least one Electronic Article Surveillance (EAS) loop of a type used for detecting the passage of traditional EAS tags, wherein the Detecting Unit detects electromagnetic fields emitted by the EAS loop and the Emitting Unit and distinguishes between them, an alarm being generated if a predetermined sequence of fields is detected.

23. A method according to claim 22, wherein the alarm is generated when a disallowed sequence of visits to one or more EAS loops or Emitting Units is detected.

24. A method according to claim 23, wherein the alarm is generated when proximity to an EAS loop is detected more than twice in sequence without an intervening detection of proximity to an Emitting Unit.

25. A method according to claim 22, wherein the article to be protected is a supermarket trolley.

26. A method according to claim 22, wherein the Detecting Unit measures a field strength of a detected field.

27. A method according to claim 22, wherein the Detecting Unit measures a time taken from a point when a field is first detected to a point where the field reaches a predetermined field strength.

28. A method according to claim 22, wherein the Emitting Unit selectively emits an electromagnetic radiation pattern chosen from a set of characteristic electromagnetic radiation patterns, the selection being made in response to a switch setting or an external signal.

29. A method according to claim 28, wherein the Detecting Unit applies a different alarm response for different detected characteristic electromagnetic radiation patterns.

30. A method according to claim 22, wherein the Detecting Unit keeps an internal log of its usage patterns.

31. A method according to claim 22, wherein the Detecting Unit is uniquely identifiable by way of identification code or number provided as part of an internal memory state.

32. A method according to claim 22, wherein the Detecting Unit is in communication with a unit adapted to scan a loyalty card issued to a person, the loyalty card including a unique personal identification number serving to identify the person, and wherein the Detecting Unit is adapted to incorporate the unique personal identification number in an internal memory state.

33. A method according to claim 22, wherein the Detecting Unit is operable to report all or part of an internal memory state by way of modulation of the alarm.

34. A method according to claim 22, wherein the Detecting Unit is operable to report all or part of an internal memory state in response to an interrogation signal from an interrogation unit adapted to issue an interrogation signal and to receive a response signal from the Detecting Unit.

35. A method according to claim 22, wherein a plurality of Emitting Units is provided at predetermined locations, each Emitting Unit emitting a distinguishable electromagnetic field, and wherein the Detecting Unit detects when and how often it passes each Emitting Unit and transmits this information, together with a unique identification code or number serving to identify the Detecting Unit, to a central computer.

36. A method according to claim 22, wherein a plurality of Emitting Units is provided at predetermined locations, each Emitting Unit emitting a distinguishable electromagnetic field, wherein the Detecting Unit is provided with a visual display or sound generator, and wherein the Emitting Units transmit information to the Detecting Unit so as to activate the visual display or sound generator to issue a visible or audible signal.

37. A method according to claim 22, wherein a plurality of Emitting Units each provided with a visual display or a sound generator is provided at predetermined locations, wherein the Detecting Unit is provided with a transmitter for transmitting information to the Emitting Units so as to indicate its presence, and wherein the visual display or sound generator is activated to issue a visible or audible signal in response to the presence of the Detecting Unit.

38. A security system for protecting articles, the system comprising at least one electronic Article surveillance (EAS) loop, one Emitting Unit and one Detecting Unit attached to each article to be protected, the Detecting Unit having a detector to detect electromagnetic fields emitted by the EAS loop and the Emitting Unit and to distinguish between them, and an alarm generator for generating an alarm if a predetermined sequence of fields is detected.

39. A method of providing security for articles, wherein there is provided at least one Electronic Article Surveillance (EAS) loop, at least one Emitting Unit, and at least one Detecting Unit attached to each article to be protected, and wherein the Detecting Unit is adapted to detect electromagnetic fields emitted by the EAS loop and the Emitting Unit and to distinguish between them, an alarm being generated if a predetermined sequence of fields is detected.

\* \* \* \* \*